US012664405B2

(12) United States Patent
da Silva et al.

(10) Patent No.: US 12,664,405 B2
(45) Date of Patent: Jun. 23, 2026

(54) CROSS-CUSTOMER WEIGHTED FEDERATED DOMAIN ADAPTATION FOR EVENT DETECTION IN WAREHOUSES

(71) Applicant: Dell Products L.P., Round Rock, TX (US)

(72) Inventors: Pablo Nascimento da Silva, Niterói (BR); Paulo Abelha Ferreira, Rio de Janeiro (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 834 days.

(21) Appl. No.: 17/929,087

(22) Filed: Sep. 1, 2022

(65) Prior Publication Data

US 2024/0078409 A1 Mar. 7, 2024

(51) Int. Cl.
*G06N 3/045* (2023.01)
*G06F 18/214* (2023.01)

(52) U.S. Cl.
CPC ......... *G06N 3/045* (2023.01); *G06F 18/2155* (2023.01)

(58) Field of Classification Search
CPC .......................... G06F 18/2155; G06F 18/214
See application file for complete search history.

(56) References Cited

U.S. PATENT DOCUMENTS

2021/0312725 A1* 10/2021 Milton .................... G07C 5/008
2021/0390352 A1* 12/2021 Rosman .............. G06F 18/2193
2022/0083363 A1* 3/2022 Lewis ..................... H04L 67/34
2022/0222583 A1* 7/2022 Wouhaybi ............... H04L 67/52
2022/0245459 A1* 8/2022 Laskaridis ............. G06N 3/082

OTHER PUBLICATIONS

Tahmoresnezhad et al., "Visual Domain Adaptation via Transfer Feature Learning," in 50.2 Knowledge and Info. Sys. 585-605 (2017). (Year: 2017).*

B. McMahan, E. Moore, D. Ramage, S. Hampson and B. y Arcas, "Communication-Efficient Learning of Deep Networks from Decentralized Data." In Artificial Intelligence and Statistics, pp. 1273-1282, 2017.

Y. Ganin, E. Ustinova, H. Ajakan, p. Germain, H. Larochelle and F. Laviolette, "Domain-Adversarial Training of Neural Networks," Journal of Machine Learning Research, vol. 17, No. 59, pp. 1-35, May 26, 2016.

* cited by examiner

*Primary Examiner* — Ryan C Vaughn

(74) *Attorney, Agent, or Firm* — Workman Nydegger

(57) ABSTRACT

One example method includes registering, by a customer, with a service provider, receiving, by the customer from the service provider, a global machine learning model, running, by the customer, the global machine learning model as a local machine learning model, collecting, by the customer, unlabeled data generated by edge devices operating in a customer domain, checking, by the customer, to determine if the customer domain has changed, and when it is determined that the customer domain has changed, performing, by the customer, a model adaptation process on the local machine learning model, and transmitting to the service provider, by the customer, gradients that comprise customer implemented changes to the local machine learning model.

20 Claims, 6 Drawing Sheets

CROSS-CUSTOMER WEIGHTED FEDERATED DOMAIN ADAPTATION FOR EVENT DETECTION IN WAREHOUSES

FIELD OF THE INVENTION

Embodiments of the present invention generally relate to training and use of machine learning models. More particularly, at least some embodiments of the invention relate to systems, hardware, software, computer-readable media, and methods for cross-customer training of an ML model, while preserving the privacy of customer data used to train and refine the ML model.

BACKGROUND

Machine learning (ML) models for event detection may be used in a variety of applications, by various types of users. Considerations such as the quality of the model performance, and the speed with which the model is trained, such as by way of a federated learning process, might be improved if the model could be shared among multiple users with disparate, or even competing, interests. However, there are significant barriers to creation, training, and use, of a shareable, cross-customer ML.

One of such challenges concerns building a shareable ML model while also preserving the privacy of the data of the parties involved, such as customers. For example, in order to be able to sell a machine learning service for event detection, there should be a way to train these models without seeing the customer data. On the other hand, it may be important that the trained model be shareable with as many customers as possible. At present, however, there is no known way to implement such sharing without exposing customer data.

Another current challenge concerns the need to keep the ML model, such as an event detection model, updated using only unlabeled data from each customer. One of the most expensive tasks in building a new machine learning pipeline is how to collect, manipulate and label the necessary data. Sometimes, this data collection and labelling can make the utilization of a machine learning approach to solve the problem infeasible.

A final example of challenges known to exist in the field of ML models relates to imbalances in the amount of data processed by each prospective user of a model. For example, each customer may handle its data collections differently, so occasionally, members of a federation may have a disparity in the amount of data processed in each iteration of the sharable model training.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figures 1, 3:
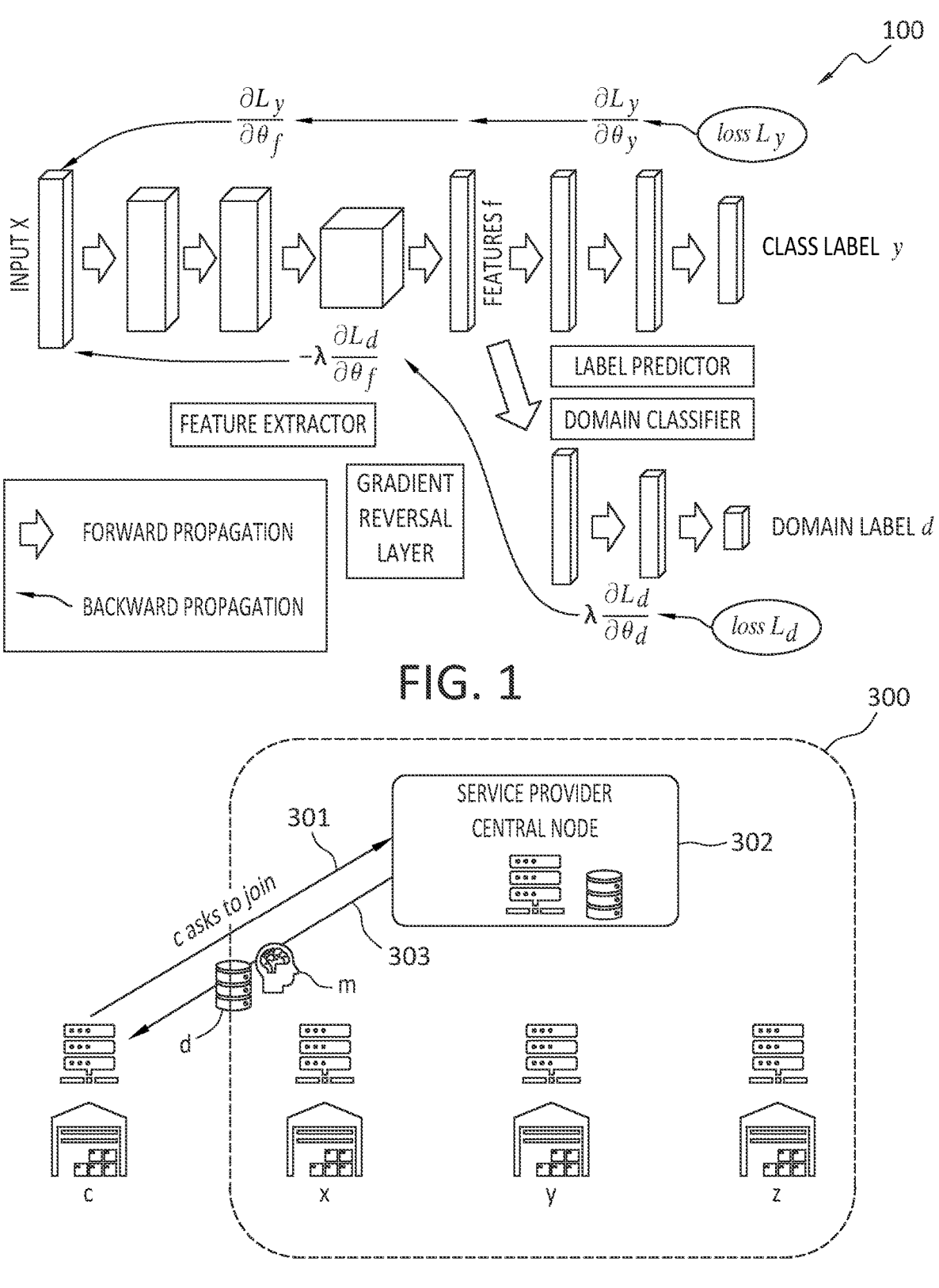
FIG. 1 discloses an example Domain Adversarial Neural Network (DANN).
FIG. 3 discloses an example customer registration process.

Embodiments of the present invention generally relate to training and use of machine learning models. More particularly, at least some embodiments of the invention relate to systems, hardware, software, computer-readable media, and methods for cross-customer training of an ML model, while preserving the privacy of customer data used to train and refine the ML model.

In general, some embodiments employ a mechanism to perform a federated domain adaptation inside an entity domain, such as a customer warehouse for example, that may take advantage of the amount of available data that has been collected at an edge node defined by an edge device such as a forklift or AMR (autonomous mobile robot). At the same time, some embodiments may also provide a method for updating the general model used cross-customers. Thus, a possible outcome of some embodiments is to provide each customer, such as a warehouse for example, with a personalized event detection model from unlabeled data without sharing its private data with a provider of ML model training services, or with other customers. Some embodiments may perform a weighted federated aggregation of the gradients, that is, ML model changes, based on the dataset from each edge node. It is noted that the term "data" is used in singular or plural form in this disclosure.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an ML model may be trained using a federated learning process, while the privacy of the data of the entities providing training data may be preserved. As another example, embodiments of the invention may be responsive to changes in the training data resulting from changes in the domain(s) where the training data is generated. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

Various companies with operations in logistics domains are actively looking for ways to innovate in terms of how to manage a large diversity of edge devices, examples of which include, but are not limited to, Autonomous Mobile Robots (AMRs) and forklifts with intelligent sensors such as, but not limited to, GPS (global positioning system), inertial measurement unit (IMU), and RFID (radio frequency identification). One typical application of machine learning models in these environments is event detection inside warehouses. In one example embodiment of the invention, an event detection approach may be used to determine when a given forklift or AMR is performing unsafely, by way of an anomaly detection technique. When an unsafe condition event is detected, or predicted, the behavior of the mobile entity may be reported to a central unit, or any expert system, to properly correct the problem, such as by actuation of an alarm perceptible by one or more human senses.

In some embodiments, a provider may provide machine learning services, possibly on an MLaaS (machine learning as a service) basis to one or more subscribers and/or other customers. The provided services may include providing event detection models for mobile entities working inside customer warehouses. Because of the potential problems that could occur if confidential customer data is exposed, example embodiments may provide mechanisms and processes, both in the ML model training process and in providing the ML models to customers, to preserve the confidentiality of customer data. Embodiments may also operate to accommodate constant and rapid changes in the domain(s) where the ML model(s) are deployed, or expected to be deployed. In more detail, some embodiments are directed to a method for training ML models across customers that can manage changes in the application domain by employing a federated learning version of adversarial domain adaptation in neural networks. Some embodiments may also take into consideration the differences in the amount of data collected by each member of the federation so that no one member, or subset of members, influences the final model unevenly or disproportionately.

B. Context

Some embodiments may employ various ML concepts, examples of which include Federated Learning (FL) and Domain Adversarial Neural Networks (DANN), which are explained below. Various aspects of FL can be found in B.

McMahan, E. Moore, D. Ramage, S. Hampson and B. y Arcas, *"Communication-efficient learning of deep networks from decentralized data.,"* In *Artificial Intelligence and Statistics*, pp. 1273-1282, 2017, incorporated herein in its entirety by this reference. Various aspects of DANN can be found in Y. Ganin, E. Ustinova, H. Ajakan, P. Germain, H. Larochelle and F. Laviolette, *"Domain-adversarial training of neural networks,"* *Journal of Machine Learning Research*, vol. 17, no. 59, pp. 135, 2016 ("Y. Ganin"), incorporated herein in its entirety by this reference.

In general, Federated Leaning (FL) embraces a machine learning paradigm that emerges as a solution to privacy-preservation demands in artificial intelligence. Federated Learning is a distributed machine learning training procedure with the aim of building a machine learning model without explicitly exchanging training data between devices in the federation. As such, an FL process may guarantee that data is kept private and only gradient updates resulting from distributed training are shared with members of the federation. Further, Domain Adversarial Neural Networks embrace a machine learning technique that aims to adapt neural networks to new domains, by leveraging unlabeled data from the new domain and a small amount of labeled data from the previous domain.

With reference briefly to FIG. 1, an example of a Domain Adversarial Neural Network (DANN) 100 is disclosed. In general, training a DANN may involve optimizing the following:

$$E(\theta_f, \theta_y, \theta_d) =$$

$$\frac{1}{n}\sum_{i=1}^{n}L_y^i(\theta_f, \theta_y) - \lambda\left(\frac{1}{n}\sum_{i=1}^{n}L_d^i(\theta_f, \theta_d) + \frac{1}{N-n}\sum_{i=n+1}^{N}L_d^i(\theta_f, \theta_d)\right)$$

by finding the stationary points of the following gradient updates:

$$\theta_f \leftarrow \theta_f - \mu\left(\frac{\partial L_y^i}{\partial \theta_f} - \lambda\frac{\partial L_d^i}{\partial \theta_f}\right)$$

$$\theta_y \leftarrow \theta_y - \mu\frac{\partial L_y^i}{\partial \theta_y}$$

$$\theta_d \leftarrow \theta_d - \mu\frac{\partial L_d^i}{\partial \theta_d}$$

where $\mu$ is the learning rate, n is the number of labeled instances and N is a total number of data samples.

C. Further Aspects of Some Example Embodiments

C.1 General Considerations

Some example embodiments are directed to a method for cross-customer privacy training an ML (machine learning) model for event detection in edge devices. Examples of such edge devices, each of which may define or correspond to a respective edge node, include, but are not limited to, vehicles such as AMRs and forklifts. Some embodiments may operate to train the ML model by leveraging the federated learning and domain adaptation methods. Note that while reference herein is made to some particular edge devices, such as forklifts, and operating domains, such as warehouses, those edge devices and operating domains are presented for the purposes of illustration, and are not intended to limit the scope of the invention in any way.

Some embodiments are directed to the goal of keeping event detection models updated using only the unlabeled data collected in the edge device operating domain, such as a warehouse, without looking at or exposing the unlabeled data, that is, keeping the data private since companies do not want to share their data with other companies. Some embodiments may thus address and resolve three challenges or technical problems, namely: (1) building a shareable model while keeping data private; (2) having only access to unlabeled data to maintain the model up to date; (3) imbalance in the amount of data gathered per customer. To this end, some embodiments are directed to approaches or technical solutions based on combining federated learning and domain adaptation in a framework to aggregate the gradients being sent to one or more central nodes in an intelligent fashion. Some embodiments may accordingly possess various aspects, including: (1) leveraging unlabeled data, while (2) adapting federated learning to deal with data imbalance across customers.

C.2 Example Methods

Figure 2:
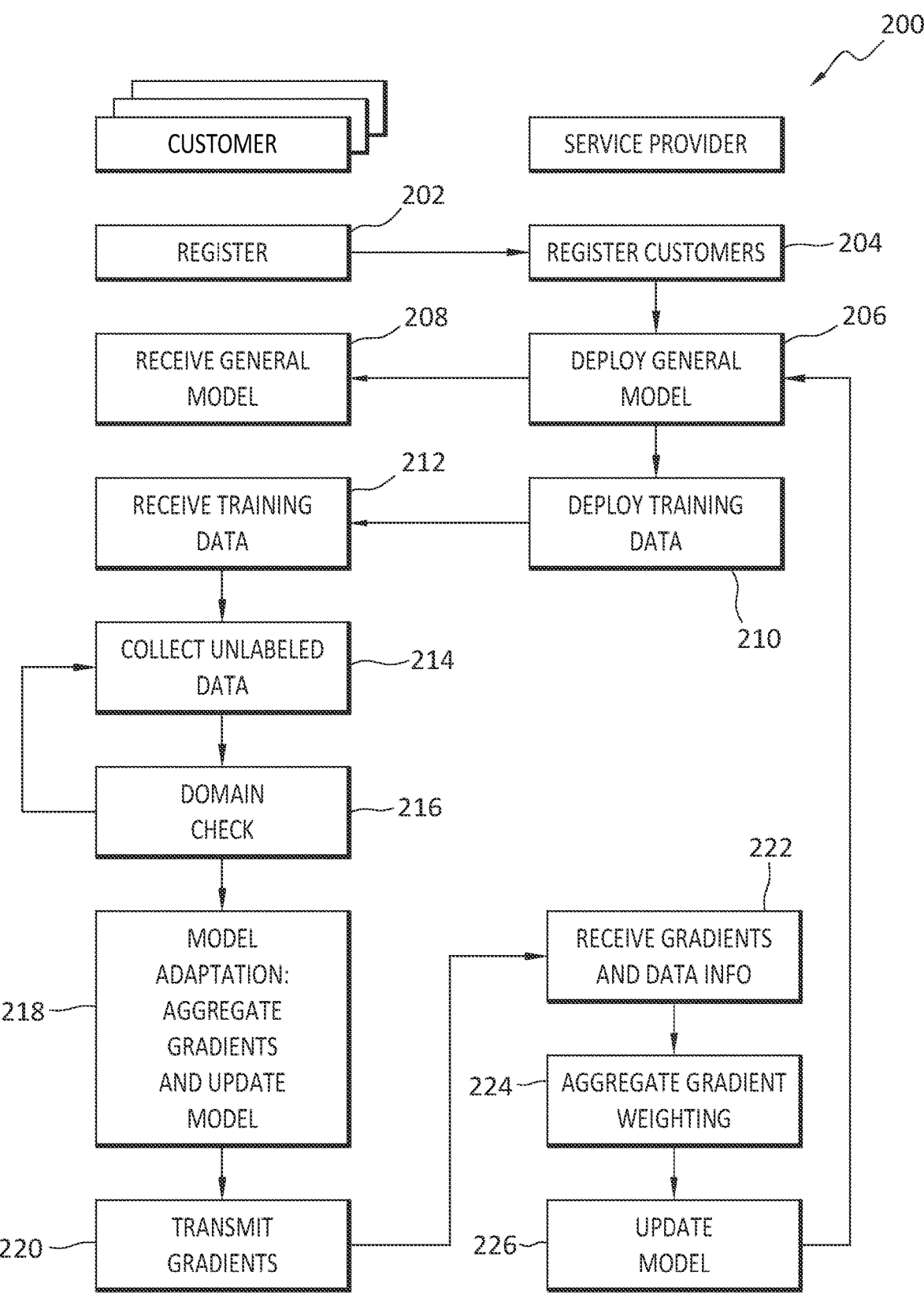
FIG. 2 discloses an example method according to some embodiments.

It is noted with respect to the disclosed methods, including the example method of FIG. 2, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, details are provided concerning methods for federated training of an ML model while maintaining data privacy, and accommodating data imbalances. In more detail, the method may perform a federated domain adaptation inside customer warehouses that takes advantage of the amount of collected data by each customer edge device, such as, forklift or AMR, and at the same time update the general model used cross-customers. Thus, some embodiments may provide each customer, such as a warehouse, with a personalized event detection model developed from unlabeled data without sharing its private data with the service provider or with other customers. As discussed below, embodiments may perform a weighted federated aggregation of the gradients based on the dataset from each edge node.

One example of such a method is denoted generally at 200. The example method 200 may be performed cooperatively by one or more customers that need/use an ML model in their operations, and a service provider that is able to update the ML model, using a federated learning process, and then deploy the updated model to the customers. Note that while the discussion below refers to a single 'customer,' it should be understood that the method 200, and any portion(s) of the method 200, may be performed simultaneously or in an overlapping manner, by multiple different customers. Finally, the method 200 may begin with a previously trained general model (m) for event detection owned by the service provider. This model may be trained on internal data of the service provider, for example, data from warehouses and factories operated by the service provider.

The example method 200 may begin when a customer initiates 202 a registration process with a service provider, which may then register 204 the customer upon satisfaction, by the customer, of registration criteria defined by the service provider. As part of the registration process, or separately, a customer may provide input to the service provider as to the needs of the customer, and information about the customer domain, so as to enable the service provider to identify a model, or models, suited to the needs of the customer.

Upon successful registration 204, the service provider may then deploy 206 a general model, which may be received 208 by the customer. The service provider may also deploy 210 a copy of internal data, which may comprise training data that was used by the service provider to train the deployed model, to a datacenter associated with the customer.

After receipt 212 of the data from the service provider, the customer may begin to collect 214 unlabeled data from one or more edge devices such as IoT devices, that is, data that has not been classified or annotated by a human, generated in connection with operations in the customer domain. From time to time after a pre-defined amount of data, such as a statistically significant amount of data and/or an amount of data determined by the service provider, has been collected 214, the customer may perform a domain check 216 to determine if the data being collected at 214 is in the same domain as the current domain, that is, the domain initially determined by, and corresponding to, the data that was deployed at 210. For example, the deployed data 210 may correspond to a particular domain, but it may turn out that customer operations in the customer domain vary to some extent from the initial conditions that were assumed/defined. If the variance is determined to be significant, exceeding a pre-determined threshold for example, a determination may be made at 216 that the actual domain of the customer is not the same as the current domain.

To illustrate with a simple example, consider an ML model that is trained to recognize the Arial font. If that ML model is deployed in an environment that uses only Calibri font, then it may be said that the domain has changed, that is, from Arial to Calibri. In this case, the ML model would have to be re-trained, possibly with data from the Calibri environment, to recognize the Calibri font. As another example, an ML model may be trained with data indicating operation of a forklift by a driver. During this initial phase, the driver adhered to all the applicable rules concerning operation of the forklift. However, it may turn out that in practice, the driver operates recklessly, so much so, that there is a significant deviation between actual driving practices and the driving practice data that was used to train the model. In this example, the domain has thus changed.

If it is determined at 216 that the customer is not operating in a new domain, the collection of data 214 may continue. On the other hand, if it is determined 216 that the customer is operating in a new domain, then a model adaptation process 218 may be performed. The model adaptation process 218 may comprise aggregating the gradients, that is, changes to the model that are needed based on the data collected 214, and using those gradients to update the model that is running in the customer domain. The gradients, as well as information indicating the amount of data collected

214 by the customer, may then be transmitted 220 by the customer to the service provider.

After receipt 222 of the gradients and data amount information, the service provider may then aggregate 224 the gradients from all customers and weight the gradients as a function of the respective amounts of data collected by the customers. For example, the gradients of a customer that collected 2× data may be weighted less heavily than the gradients of a customer that collected 5× data. The gradient weighting may or may not be linear.

The aggregated gradients from all the customers may then be used by the service provider to update 226 the model. At this point, the method 200 may then return to 206 and deploy the updated model to the customer. Further details concerning various operations of the method 200 are discussed in more detail below.

C.2.1 New Customer Registration

With attention now to FIG. 3, there is disclosed a configuration in which a new customer c asks to join a system 300 by sending a message 301 to a central node 302 of a service provider. If c is accepted in the system 300, then c may receive 303 the model m and a copy of the dataset d.

In more detail, whenever a new customer c, such as a warehouse, registers in the system and requests use of the model services provided by a service provider, the central node of the service provider may process this information and send to the new customer the actual model m and part of the central dataset d. The central node may also initialize the structures to receive updates from the new customer. The central node may also send to the customer a configuration file containing all the information needed by the customer to operate in the new environment. The configuration file may include, for example, the number of local training steps, interval of data collection, time to send model updates to the central node, and type of data collected, among others.

C.2.2 Data Collection

Figure 4:
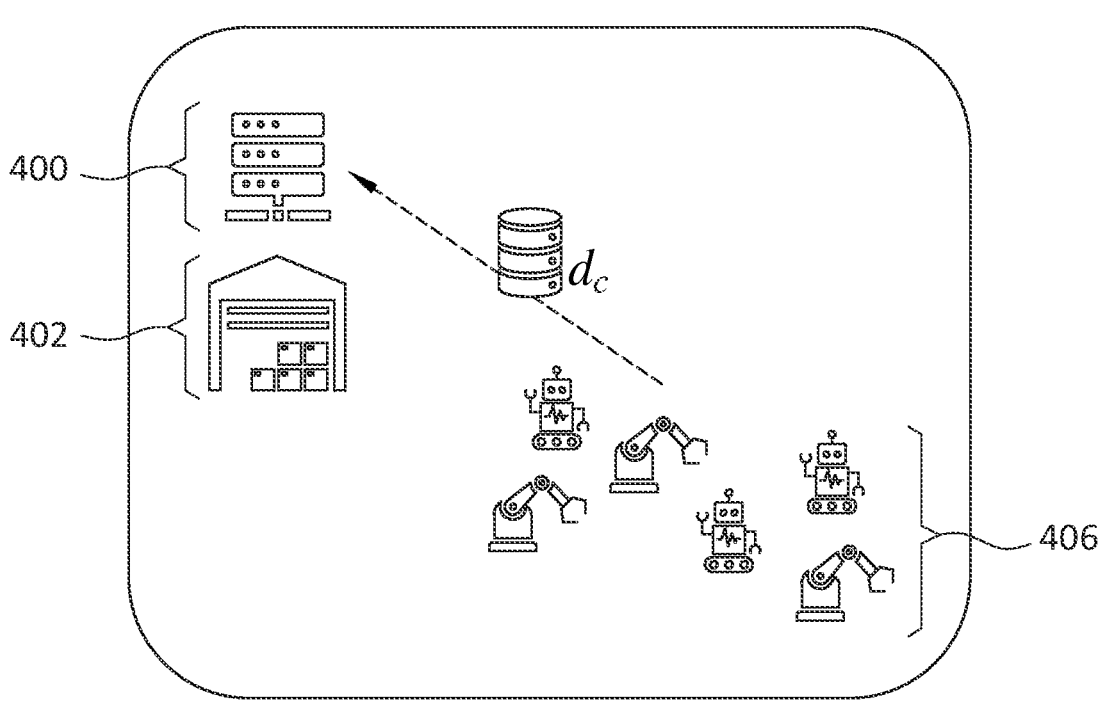
FIG. 4 discloses an example data collection process.

After customer registration, and with reference now to FIG. 4, the ML model 400 starts to work inside the warehouse 402, or other domain, of the new client c, and a data collection procedure begins. Particularly, embodiments may collect the data $d_c$ for updating the model 400 to operate well in the new environment, such as warehouse c. To this end, edge devices 406, such as forklifts, AMRs, and other equipment inside the warehouse 402, may start collecting data.

The data collected by the edge devices 406 may be any data used to train the ML model 400, such as, but not limited to, GPS, Inertial Measurement Unit (IMU) data, RFID positioning, gyroscope, speed, velocity, acceleration, deceleration, and angular momentum, among other data. The type of data collected may depend on the information stored inside the configuration file received from the central node. Note that all data collected at this stage may be unlabeled, that is, there is no information available about the event class, or event (such as excessive speed), to which the data refers. The information about the class may not be necessary since embodiments may be using the DANN to perform domain adaptation, and the data from the central note may provide all the information needed to keep the model accurate to detect the events being tackled.

C.2.3 Verification of Domain Change

Once a pre-defined amount of data is collected inside the warehouse, the system may start a verification procedure to determine if the environment data domain is still in accordance with the original data domain. This process may comprise checking the data distribution available in the original data sent by the service provider to the customer, and the collected data. If the distribution divergence between these two datasets is higher than a threshold, then it may be concluded that the domain has changed, and the adaptation procedure may be started. Note that any divergence approach that measures the similarity between two probability distributions may be applied to check the change in the domain, and such divergence approaches may include Kullback-Leibler divergence, and Jensen-Shannon divergence, for example. If the distributions are high-dimension, the divergence may be applied across independent dimensions, or other techniques for measuring such divergences may be used.

After the verification, if the divergence between the original dataset and the collected dataset is higher than a threshold th, then it may be concluded that the respective domains which with those datasets are associated have diverged, that is, changed, and the ML model adaptation procedure may be started to accommodate the change in the domain. Embodiments may also update the current $d_0$ (initial dataset) with samples from the new domain $d_c$, for domain verification. The model adaptation procedure may run with the original dataset, as can be seen in the next section.

Figure 5:
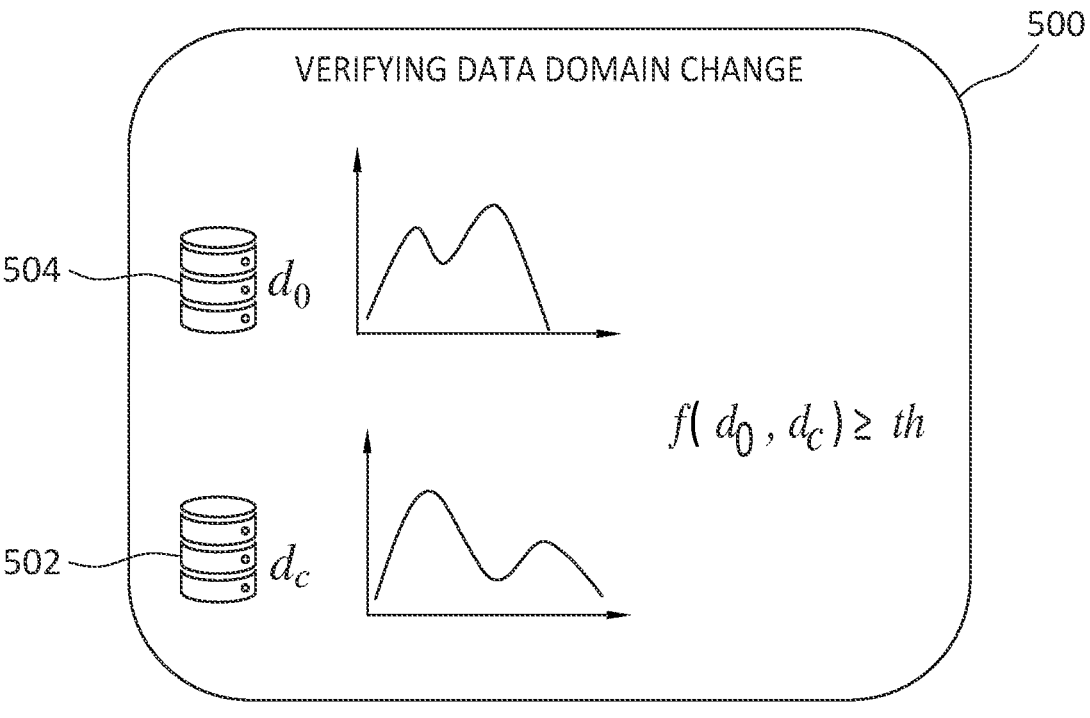
FIG. 5 discloses an example domain change verification process.

FIG. 5 depicts an example process 500 for verifying domain changes. Particularly, FIG. 5 discloses data collection de 502 comprising data collected in a warehouse, which is compared with the baseline do 504 of data currently used to train the machine learning model, which represents the current data domain. After the verification, if the divergence between the datasets de 502 and do 504 is equal to, or greater than, a threshold th, then it may be said that the domains have diverged, or changed, and the model adaptation procedure may accordingly be started.

C.2.3 Updating Local and Global Models

Figure 6:
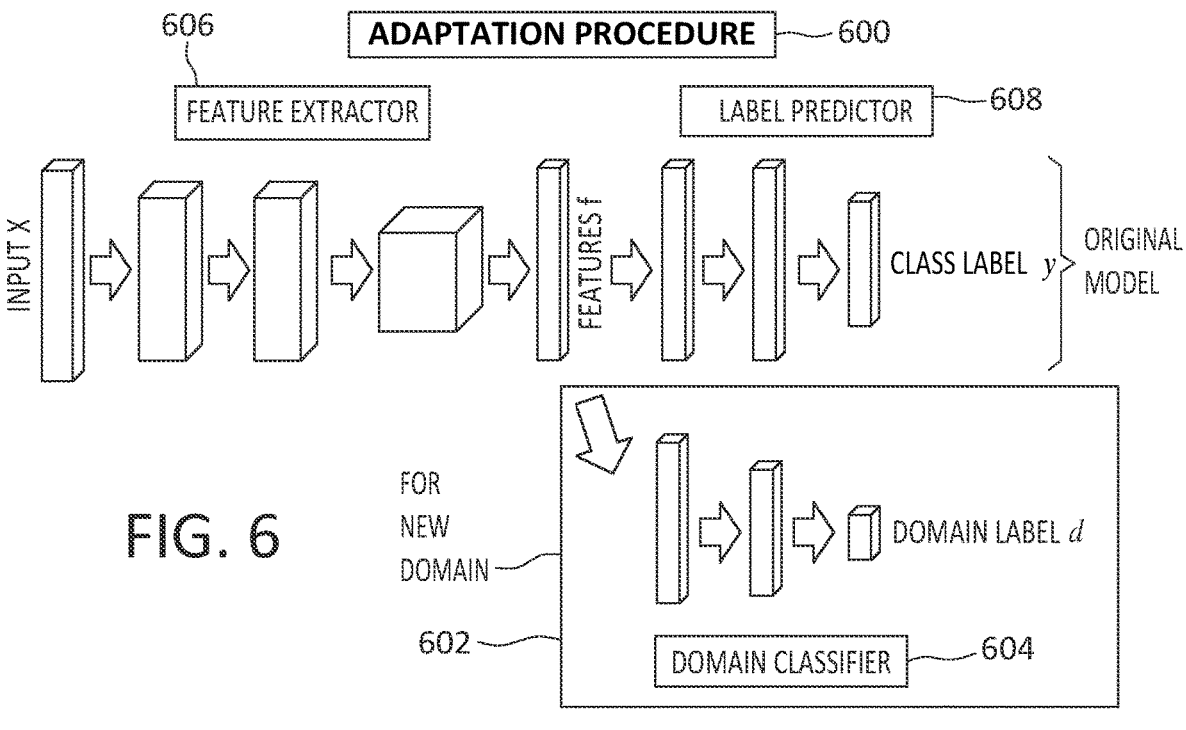
FIG. 6 discloses an example model adaptation process.

With reference first to the local model, the local model refers to the model that is adapted to work on the domain data available in the customer warehouse, or other domain. This model may be updated when a shift in data distributions is identified, that is, when the divergence between the two data distributions respectively associated with the local model and the global model is higher than a given threshold, as described earlier. So, once a domain change is identified, embodiments may start the model adaptation procedure. In some embodiments, model adaptation, which may be performed at an edge device and/or at the service provider, may comprise obtaining the event detection network, and adding a branch to that event detection network. This branch in the network may be used by the DANN to update the network to the new domain. FIG. 6 discloses an example adaptation procedure 600 to add, in an event detection network that may comprise a neural network, a branch 602.

Figure 7:
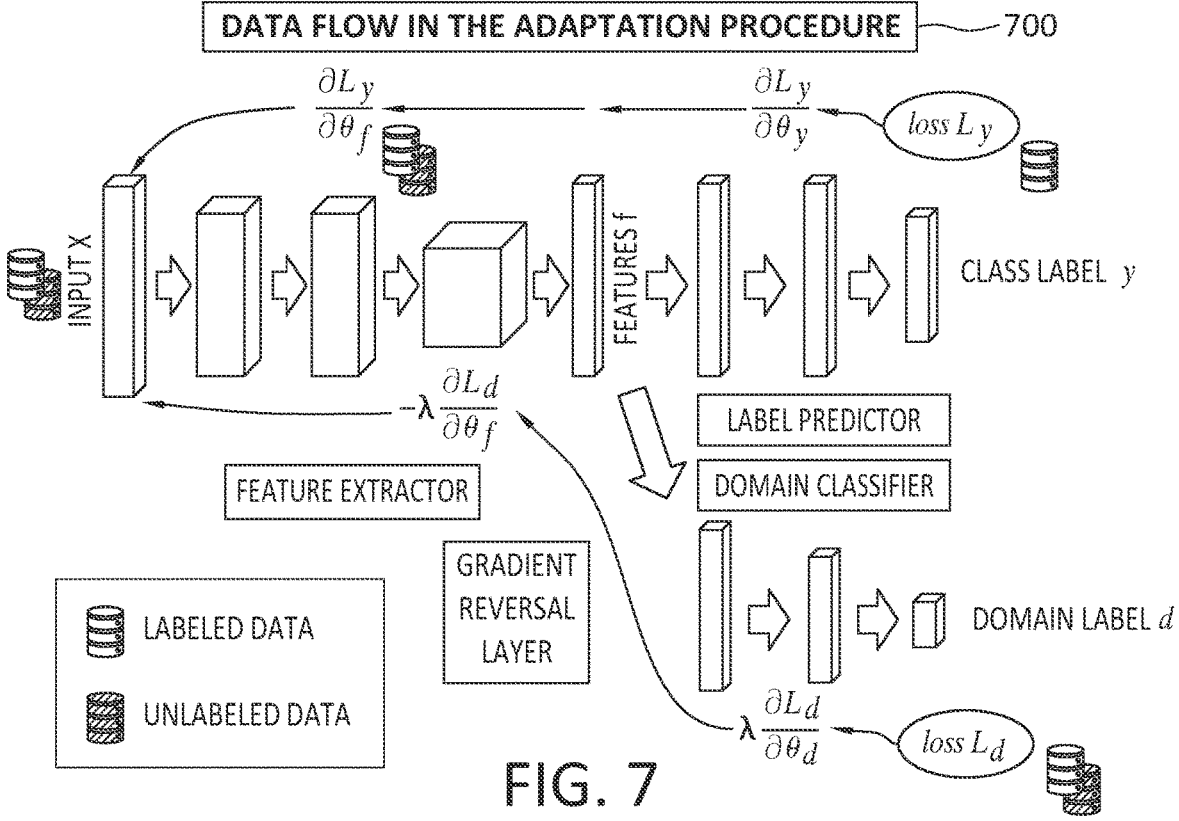
FIG. 7 discloses an example data flow for a model adaptation process.

An example data flow 700 that may occur in a local model adaptation procedure is disclosed in FIG. 7. Further details concerning examples of such data flows may be found in Y. Ganin.

In more detail, in the model adaptation procedure, a new branch 602 may be added to the local model, which may be maintained at a central node, and the new branch 602 may be used to update the local model using the unlabeled data of the new domain. A domain classifier 604 in the local model may operate to classify a domain as new, based on data collected by the edge device where the local model is operating.

Figure 8:
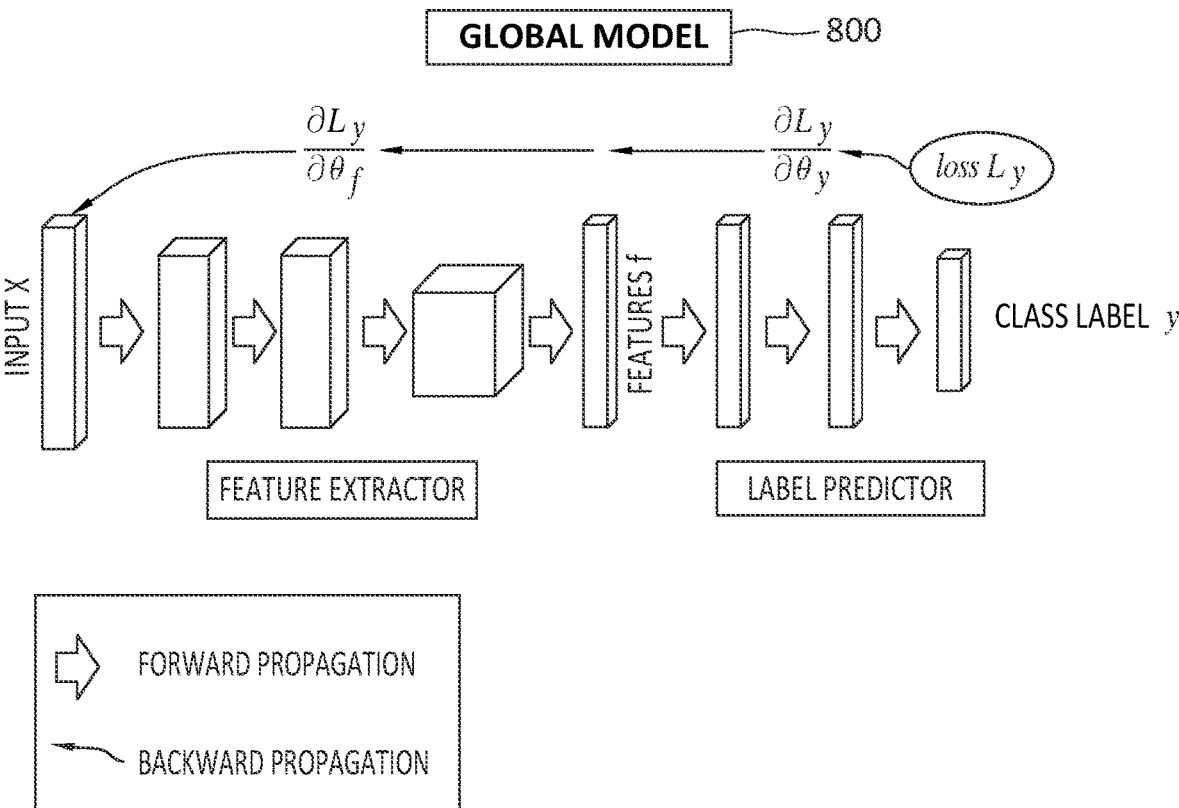
FIG. 8 discloses an example global model prior to modification.

With reference next to the global model, the global model m refers to the model owned or managed by the service provider, and which may be shared with all customers. FIG. 8 discloses an example of a global model 800 prior to being updated to reflect a domain change.

To update the global model, after the update of the local model performed in the adaptation procedure, the customer(s) may send the gradients to the central node of the service provider in order to enable the service provider to update the global model in a federated learning fashion. These gradients that are shared by the edge nodes with the central node may be those generated from the feature extractor 606 and label predictor 608 parts of the DANN. Along with the gradients, embodiments may send to the central node, the amount of data used to train the adaptation procedure for updating the local model. This information about the amount of data may then be used in the aggregation procedure of the federated learning process to balance and give a weight to the models that have seen more data.

C.2.4 Weighted Aggregation to Update the Global Model

To update the global model, embodiments may send information about the amount of data $a_i$, for each customer i, used to train the local model. The gradients $$\Delta_f^i \text{ and } \Delta_y^i$$

represent the updates for feature extractor and label predictor for customer i, respectively. These gradients may be the ones sent by the edge nodes to the central node. The aggregation function is then defined as:

$$\text{update} \leftarrow \sum_{i=0}^{|C|} \text{agg}\left(a_i, \Delta_f^i, \Delta_y^i\right)$$

where C is the number of customers.

D. Further Discussion

As will be apparent from this disclosure, example embodiments of the invention may provide various useful features and functionalities. For example, some embodiments are directed to a system for cross-customer weighted event detection models in domains, such as warehouses, by adapting a combination of federated learning and domain adaptation to address data domain changes. This may allow for maintaining the privacy of the customer data while updating both the global model and the local models.

As another example, some embodiments may leverage unlabeled data from each customer to update event detection models. This approach may keep both the local and global event detection models updated without the need to spend money and time to label the data. Further, some embodiments may operate to update a sharable global model while keeping the customer data private. Finally, some embodiments may implement federated learning through weighted aggregation to deal with unbalanced respective amounts of data processed by each customer.

E. Further Example Embodiments

Following are some further example embodiments of the invention. These are presented only by way of example and are not intended to limit the scope of the invention in any way.

Embodiment 1. A method, comprising: registering, by a customer, with a service provider; receiving, by the customer from the service provider, a global machine learning model; running, by the customer, the global machine learning model as a local machine learning model; collecting, by the customer, unlabeled data generated by edge devices operating in a customer domain; checking, by the customer, to determine if the customer domain has changed, and when it is determined that the customer domain has changed, performing, by the customer, a model adaptation process on the local machine learning model; and transmitting to the service provider, by the customer, gradients that comprise customer implemented changes to the local machine learning model.

Embodiment 2. The method as recited in embodiment 1, wherein the global machine learning model comprises an event detection model operable to detect occurrence of specified events in the customer warehouse.

Embodiment 3. The method as recited in any of embodiments 1-2, wherein the global machine learning model comprises respective weighted gradients generated by the customer, and by other customers.

Embodiment 4. The method as recited in any of embodiments 1-3, wherein the data collected by the customer remains confidential with the customer and is not shared with other customers.

Embodiment 5. The method as recited in any of embodiments 1-4, wherein updating the local model comprises aggregating gradients and using the aggregated gradients to update the local model.

Embodiment 6. The method as recited in any of embodiments 1-5, wherein the customer receives, from the service provider, a set of training data, and the training data is used to determine if the customer domain has changed.

Embodiment 7. The method as recited in any of embodiments 1-6, wherein checking to determine if the customer domain has changed comprises comparing training data with the collected data and obtaining a divergence between the training data and the collected data.

Embodiment 8. The method as recited in any of embodiments 1-7, wherein the customer domain is deemed as having changed when a divergence between the training data and the collected data equals or exceeds a specified threshold.

Embodiment 9. The method as recited in any of embodiments 1-8, wherein the global machine learning model is received by the customer from the service provider as-a-Service.

Embodiment 10. The method as recited in any of embodiments 1-9, wherein the global model is an updated version of a local model running at the customer prior to receipt, by the customer, of the global model.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated.

In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
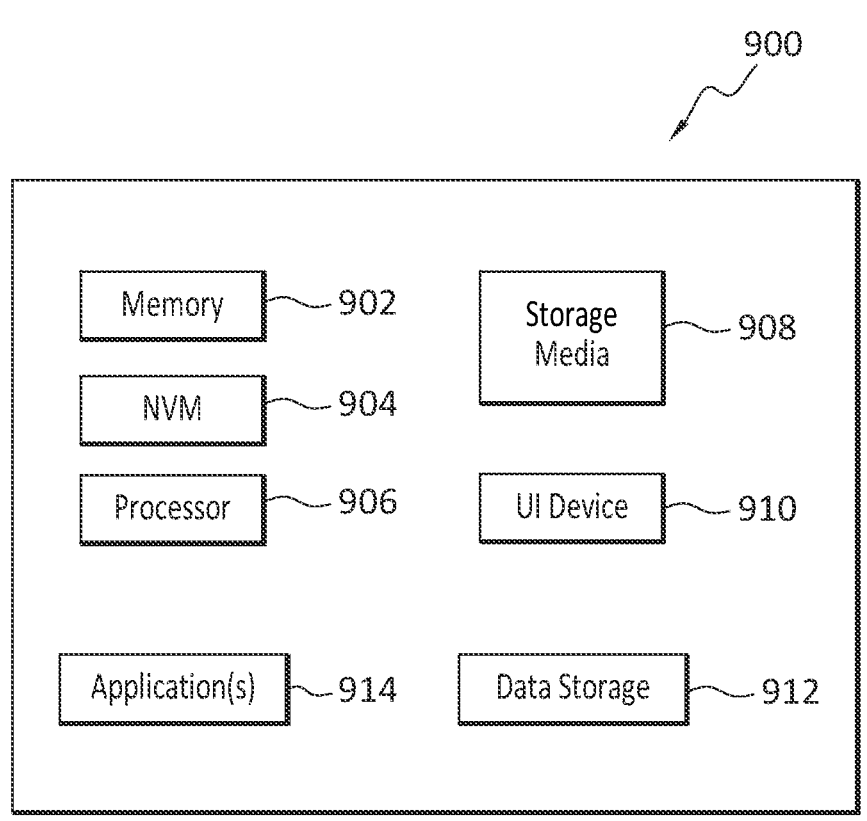
FIG. 9 discloses an example computing entity operable to perform any of the disclosed methods, processes, and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM, read-only memory (ROM), and persistent memory, one or more hardware processors 906, non-transitory storage media 908, UI (user interface) device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

registering, by a customer computing system, with a service provider;

receiving, by the customer computing system from the service provider, a global machine learning model comprising a domain-adversarial neural network (DANN) including a feature extractor and a domain classifier;

running, by the customer computing system, the global machine learning model as a local machine learning model on edge devices operating in a customer domain;

collecting, by the customer computing system, unlabeled data generated by the edge devices operating in the customer domain;

extracting, by the feature extractor of the DANN executed by the customer computing system, features from the collected unlabeled data;

measuring a similarity between a probability distribution of extracted features of original data from an original data domain and a probability distribution of the extracted features of the collected unlabeled data, by the domain classifier of the customer computing system, to determine if the collected unlabeled data is not included in the customer domain based on the similarity;

when it is determined that the collected unlabeled data is not included in the customer domain, performing, by the customer computing system, a model adaptation process by applying a gradient in the customer domain and a gradient in a new domain of the collected unlabeled data to the global machine learning model to generate and update a local machine learning model from the global machine learning model; and transmitting to the service provider, by the customer computing system, information indicating an amount of the collected unlabeled data by the customer computing system and gradients that comprise changes between the global machine learning model and the updated local machine learning model and comprise the gradient in the customer domain and the gradient in the new domain, wherein gradients from the edge devices are used to update the global machine learning model by the service provider.

2. The method as recited in claim 1, wherein the global machine learning model comprises an event detection model operable to detect occurrence of specified events in a customer warehouse.

3. The method as recited in claim 1, wherein the global machine learning model comprises respective weighted gradients generated by the customer computing system, and by other customer computing systems.

4. The method as recited in claim 1, wherein the data collected by the customer remains confidential with the customer computing system and is not shared with other customer computing systems.

5. The method as recited in claim 1, wherein updating the local machine learning model comprises aggregating gradients and using the aggregated gradients to update the local machine learning model.

6. The method as recited in claim 1, wherein the customer computing system receives, from the service provider, a set of training data, and the training data is used to determine if the customer domain has changed.

7. The method as recited in claim 1, wherein determining if the collected unlabeled data is not included in the customer domain comprises comparing training data with the collected unlabeled data and obtaining a divergence between the training data and the collected unlabeled data.

8. The method as recited in claim 1, wherein the customer domain is deemed as having changed when a divergence between training data and the collected unlabeled data equals or exceeds a specified threshold.

9. The method as recited in claim 1, wherein the global machine learning model is received by the customer computing system from the service provider as-a-Service.

10. The method as recited in claim 1, wherein the global machine learning model is an updated version of the local machine learning model running at the customer computing system prior to receipt, by the customer computing system, of the global machine learning model.

11. A non-transitory storage medium having stored therein instructions that are executable by one or more hardware processors to perform operations comprising:

registering, by a customer computing system, with a service provider;

receiving, by the customer computing system from the service provider, a global machine learning model comprising a domain-adversarial neural network (DANN) including a feature extractor and a domain classifier;

running, by the customer computing system, the global machine learning model as a local machine learning model on edge devices operating in a customer domain;

collecting, by the customer computing system, unlabeled data generated by edge devices operating in the customer domain;

extracting, by the feature extractor of the DANN executed by the customer computing system, features from the collected unlabeled data;

measuring a similarity between a probability distribution of extracted features of original data from an original data domain and a probability distribution of the extracted features of the collected unlabeled data, by the domain classifier of the customer computing system, to determine if the collected unlabeled data is not included in the customer domain based on the similarity;

when it is determined that the collected unlabeled data is not included in the customer domain, performing, by the customer computing system, a model adaptation process by applying a gradient in the customer domain and a gradient in a new domain of the collected unlabeled data to the global machine learning model to generate and update a local machine learning model from the global machine learning model; and transmitting to the service provider, by the customer computing system, information indicating an amount of the collected unlabeled data by the customer computing system and gradients that comprise changes between the global machine learning model and the updated local machine learning model and comprise the gradient in the customer domain and the gradient in the new domain, wherein gradients from the edge devices are used to update the global machine learning model by the service provider.

12. The non-transitory storage medium as recited in claim 11, wherein the global machine learning model comprises an event detection model operable to detect occurrence of specified events in a customer warehouse.

13. The non-transitory storage medium as recited in claim 11, wherein the global machine learning model comprises respective weighted gradients generated by the customer computing system, and by other customer computing systems.

14. The non-transitory storage medium as recited in claim 11, wherein the data collected by the customer remains confidential with the customer computing system and is not shared with other customer computing systems.

15. The non-transitory storage medium as recited in claim 11, wherein updating the local machine learning model comprises aggregating gradients and using the aggregated gradients to update the local machine learning model.

16. The non-transitory storage medium as recited in claim 11, wherein the customer computing system receives, from the service provider, a set of training data, and the training data is used to determine if the customer domain has changed.

17. The non-transitory storage medium as recited in claim 11, wherein determining if the collected unlabeled data is not included in the customer domain comprises comparing training data with the collected unlabeled data and obtaining a divergence between the training data and the collected unlabeled data.

18. The non-transitory storage medium as recited in claim 11, wherein the customer domain is deemed as having changed when a divergence between training data and the collected unlabeled data equals or exceeds a specified threshold.

19. The non-transitory storage medium as recited in claim 11, wherein the global machine learning model is received by the customer computing system from the service provider as-a-Service.

20. The non-transitory storage medium as recited in claim 11, wherein the global machine learning model is an updated version of a local machine learning model running at the customer computing system prior to receipt, by the customer computing system, of the global machine learning model.

*     *     *     *     *